Sept. 13, 1949.  C. J. SMITH  2,481,789
ARTIFICIAL FISHING LURE
Filed June 10, 1946
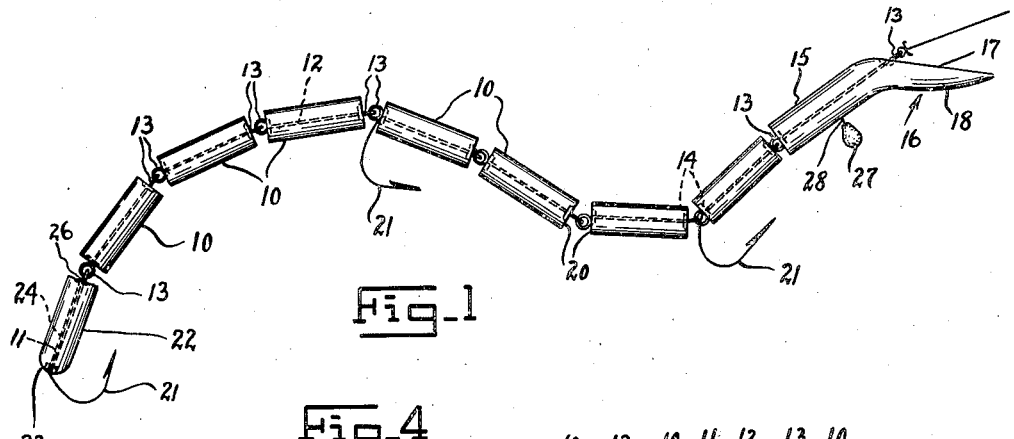
Fig-1
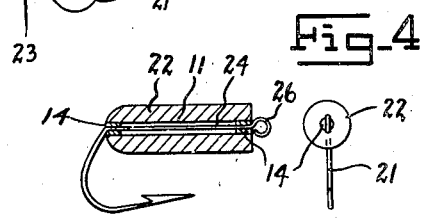
Fig-4
Fig-3
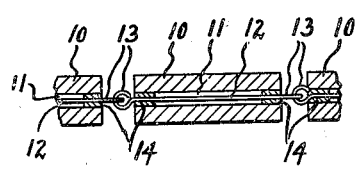
Fig-2
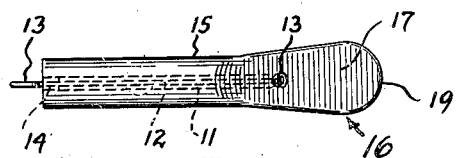
Fig-7
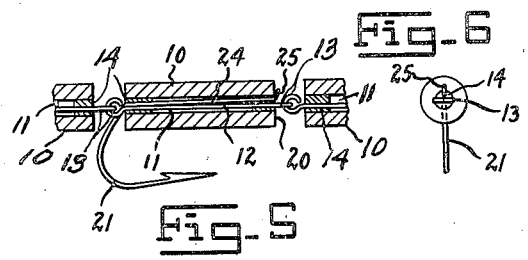
Fig-6
Fig-5
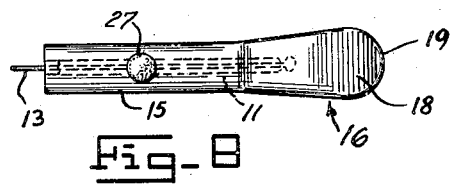
Fig-8
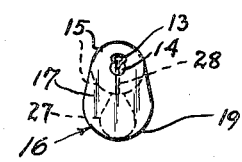
Fig-10
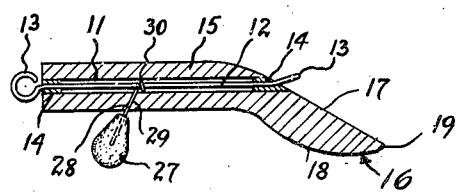
Fig-9
Inventor
Clarence J. Smith
By Clarence A. O'Brien
and Harvey B. Jacobson
Attorneys Patented Sept. 13, 1949

2,481,789

UNITED STATES PATENT OFFICE 2,481,789

ARTIFICIAL FISHING LURE

Clarence J. Smith, Lewistown, Ill.

Application June 10, 1946, Serial No. 675,638

1 Claim. (Cl. 43—42.15)

This invention relates to an artificial fishing lure or bait, and more particularly to one in the form of a wiggling worm or snake, designed to take a steady wiggling action in the water to make a strike, when trolling or reeling in the line and bait, to effectively attract and catch fish.

An object of the invention is to provide a wiggling worm artificial fishing lure, which embodies a plurality of linked body sections of material designed to float, and joined to cause a wiggling action in connection with a head having an angularly extending flat surface, designed to be effected by the pressure of the water to cause the device to take a wiggling action in the water, thereby imitating a worm or snake in the water during a serpentine wiggling action with a slow or fast steady retrieve, in connection with a weight and hooks provided on certain of the sections of the device, which are attractively painted in various bright colors and designs to lure the fish.

Another object of the invention is to provide a wiggling worm artificial fishing lure comprising a long slim member serving the purpose of a casting plug or lure for the large-mouthed game fish while also serving to capture small-mouthed game fish that are usually caught on flies with a fly rod or by still fishing with bait. The device comprises a series of linked or pivoted sections permitting independent movement of each section, and is provided with a novel form of lead section or head so shaped as to cause it to take a perfect life-like serpentine wiggling action in the water at a very slow retrieve, making it possible for it to attract and catch fish that are seldom or never caught with the stubby, bulky plugs that are in general use, and combines the advantages of a casting rod lure and fly rod lure, both by the use of casting rod alone.

Another object of the invention is to provide an artificial fishig lurs in the form of a wiggling worm or snake, which may be very easily and economically manufactured and the parts thereof assembled, to produce an attractive and comparatively cheap lure which will improve the catch of fishermen.

Other objects and advantages reside in the details of construction and operation as more fully hereinafter described and claimed, reference being had to the accompanying drawings forming part hereof, wherein like numerals refer to like parts throughout, and in which:

Figure 1 is a side elevation of a wiggling worm artificial fishing lure constructed in accordance with the invention, Figure 2 is a sectional view showing the manner of connecting the sections thereof, Figure 3 is a sectional view of the tail end section, Figure 4 is an end view of the section shown in Figure 3, Figure 5 is a view similar to Figure 2 of an intermediate section provided with a hook and showing the manner of mounting the latter, Figure 6 is an end view of the part shown in Figure 5, Figure 7 is a top plan view of the head section of the lure.

Figure 8 is a bottom plan view of the head section shown in Figure 7.

Figure 9 is a longitudinal central sectional view of the head section shown in Figures 7 and 8, and Figure 10 is a front elevation of the head section shown in Figures 7, 8 and 9.

Referring to the drawings in detail, in which like reference characters designate corresponding parts throughout the several views, the artificial fishing lure in the form of a wiggling worm or snake designed to take a serpentine wiggling action, is shown as made up of a plurality of sections, such as seven intermediate sections 10 composed of short cylindrical sections or lengths of floating material such as wood or the like, which composes the body of the lure. These sections composing the body are made up of a hardwood dowel rod or other buoyant material, which are bored longitudinally and axially or centrally thereof, as indicated at 11 from end to end and through the ends thereof. The cylindrical body sections 10 may be of uniform length, and receive through the bores 11 thereof, chain links 12 consisting of single strands of wire having eyes 13 formed at the opposite projecting ends thereof beyond the ends of the sections 10 which are connected to corresponding eyes of the next adjacent section in line to form a jointed body structure. The bores 11 may be of suitable size to receive the lengths of wires or links 12, with the eyes 13 projecting, and then the bores sealed around the wires lengthwise thereof at the ends, as indicated at 14 to anchor the links or chain wires therein and prevent the entrance of water, to interfere with the buoyancy of the sections. Thus, the jointed cylindrical sections 10 of the body are connected by a wire chain formed by the various links connected as described, to permit angular or pivoted movements of one section with respect to the other and to form a flexible chain or cable.

The head section is indicated at 15, and is similarly joined at its rear to one of the sections 10, but has its forward end formed with a flat angularly extending head portion 16, preferably projecting at an angle of 45 degrees or approximately so therefrom, and formed with a flat top surface 17 and a rounded bottom surface 18, which are wider than the cylindrical portion 15, as particularly shown in Figures 7 to 10 of the drawings, and rounded at the nose in convex formation, as indicated at 19.

Each of the links 12 have their connected eyes located between the parallel ends 20 of the sections 10, except the eye of the front link of the head or lead section 15, which is exposed in front of the flat surface 17, as shown in Figure 1 of the drawings, for the attachment of a line thereto, or a wire or gut leader of a fishing line, for use in casting, trolling, or retrieving, when pulled through the water.

Certain of the intermediate sections may be provided with hooks 21 depending therefrom, as well as the tail section 22 which is preferably rounded or convex at the free end, as indicated at 23. These hooks 21 have the shank portions 24 thereof in the intermediate sections, provided with laterally bent portions 25 at the forward ends thereof, bent over the ends 20 of the corresponding section 10 of the body to firmly anchor the same along side of the links 12 and through the bores 11. The tail section 22 has its hook 21 formed so that the shank 24 thereof extends entirely through the bore 11 of the tail section 22 and constitutes one of the links of the chain and is formed with an eye 26 which is joined to the corresponding eye 13 of the next adjacent end section 10 of the intermediate sections of the body of the lure. Also, beneath the lead section 15 at the cylindrical portion thereof in rear of the flat head, a tear drop weight 27 may be provided extending radially and having a wire 28 on which the same is formed, extending through a lateral opening 29 in the cylindrical part 15, being passed through a small hole punched through the bottom of the part 15 to the center hole or bore and wrapped around the wire link 12 of the chain provided in the lead section or head, as indicated at 30.

It is also to be understood that where the shanks of the hooks 21 are extended longitudinally through the bores or holes 11 running longitudinally through all the sections, that the ends of the bores are sealed by means of wax, solder, paint or other suitable material. The sections are ornamented with paint in bright attractive colors and designs, to make it attractive to the fish to lure the same. Also, one or two of the hooks may be eliminated from the body if necessary, to meet the requirements of state laws but it should be noted that in use, the flat surface of the head is always uppermost, except when it takes a serpentine wiggling action tending to turn and reverse its direction of turning upon being acted upon by the pressure of the water. The hooks tend to hang downwardly at all times, and therefore make a sure catch of the fish. This is due to the fact that the weight of the hooks cause the same to hang downwardly in connection with the weight 27 at the underside of the section 15 in rear of the flat head portion.

In the use of the device, with the jointed sections of the body connected by the chain links as described, between the ends thereof, the body has a tendency to rise in the water due to the buoyancy of the material thereof, whereas the hooks and weight 27 will cause the same to move downwardly, giving the tendency to sink. This results in stabilizing the lure as it is seen in the upright position in Figure 1 of the drawings, when it is pulled through the water. The water pressure acting on the flat face of the head or lead section causes it to turn and as the water pressure at the start of the turn is greater than the stabilizing power of the buoyant wood and sinking metal, the head will rise in the water and present a greater slope to the water to lose some of its pressure resulting in stabilizing power to bring it to an erect position again. The momentum throws the device off balance, causing it to attempt to turn with a serpentine wiggling action in the manner of a worm or snake going through the water. This is true in casting as well as in trolling, with a slow or fast steady retrieve caused by the shape of the head and the balance of the head, without depending upon water currents, eddies and tensions on the line to cause action, or quick jerks on the line, due to the fact that the lure is self-starting and acts merely by being drawn through the water due to the pressure of the latter on the flat top surface of the head accentuated by the broadened widened formation thereof with respect to the normal body diameter or cross-section. Among the advantages of the wiggling worm or snake artificial fishing lure, is that being long and slim, its shape makes it possible to serve the purpose of a casting plug or lure for the large mouthgame fish, while it also catches small mouth game fish that are usually caught on flies with the fly rod, or by still fishing with a bait. Its shape, being perfectly life-like, causes a serpentine wiggling action at a very slow retrieve, making it possible for it to attract and catch fish that are seldom or never caught by stubb, bulky plugs that are in general use and therefore combining the advantages of a casting rod lure and a fly rod lure both by the use of casting rod alone. The shape and design of the head and the perfect balancing effect of the little tear drop weight under the head make possible the use of principles that do not exist in common, stubby, bulky plugs that are in general use. On the other hand, it has a beautiful, serpentine action which is produced on a very slow retrieve as well as with a fast retrieve with practically no pull, strain or wear on the line or reel. Also, the device may be very economically produced and assembled and will admirably serve its purpose as an attractive lure, to improve the catch of fishermen.

While in the foregoing there has been shown and described the preferred embodiment of this invention it is to be understood that minor changes in the details of construction, combination and arrangement of parts may be resorted to without departing from the spirit and scope of the invention as claimed.

I claim as my invention:

A wiggling worm artificial fishing lure comprising a plurality of floating body sections of substantially uniform length including a tail section and a lead section, a chain having links disposed through said sections, said sections being sealed at the ends thereof, said links having eyes interconnected between the sections, a hook on the tail section and projecting from the rear end thereof downwardly and formed with an eye at the front of the tail section connected to the eye of the next adjacent section, the rear end of the tail section being rounded and all of the sections having external ornamental surfaces, other hooks projecting from certain of other of said sections downwardly and having shanks extending through said certain sections, said lead section having an angularly extended, downwardly projecting, flattened, widened head portion with a rounded undersurface, and the eye of the front link of the chain projecting from said flat surface for connection to a line, and a weight at the bottom of the lead section adjacent said rounded undersurface and having a wire shank extending into the same and wound around the link therein, said head portion causing the pressure of the water to act on the flat surface of the lure, to cause wiggling thereof in the water in retrieving, trolling or otherwise moving through the water.

CLARENCE J. SMITH.

REFERENCES CITED

The following references are of record in the file of this patent:

UNITED STATES PATENTS

| Number | Name | Date |
| --- | --- | --- |
| D. 59,436 | Smith | Oct. 18, 1921 |
| 171,769 | Buel | Jan. 4, 1876 |
| 664,476 | Hall | Dec. 25, 1900 |
| 862,206 | Sillman | Aug. 6, 1907 |
| 870,069 | Wilcox | Nov. 5, 1907 |
| 1,109,439 | Maus | Sept. 1, 1914 |
| 1,359,618 | Oliver | Nov. 23, 1920 |
| 1,406,834 | Fisher | Feb. 14, 1922 |
| 1,419,540 | Brown | June 13, 1922 |
| 1,429,571 | Davis | Sept. 19, 1922 |
| 1,474,823 | Hines | Nov. 20, 1923 |
| 1,582,713 | Welch | Apr. 27, 1926 |
| 1,737,683 | Readman | Dec. 3, 1929 |
| 1,791,316 | Jordan | Feb. 3, 1931 |
| 2,281,578 | Heddon | May 5, 1942 |